United States Patent [19]
Gillette et al.

[11] 4,179,193
[45] Dec. 18, 1979

[54] FOCUSING REFLECTOR

[75] Inventors: Roger B. Gillette, Auburn; Weightstill W. Woods, Redmond, both of Wash.

[73] Assignee: The Boeing Company, Seattle, Wash.

[21] Appl. No.: 894,819

[22] Filed: Apr. 10, 1978

[51] Int. Cl.² .............................................. G02B 5/10
[52] U.S. Cl. .................................. 350/295; 350/310
[58] Field of Search .............. 350/295, 310; 343/915; 126/270, 271

[56] References Cited
U.S. PATENT DOCUMENTS

| | | | |
|---|---|---|---|
| 3,031,928 | 5/1962 | Kepito | 350/295 |
| 3,261,016 | 7/1966 | Burr | 350/310 X |
| 4,046,462 | 9/1977 | Fletcher et al. | 350/295 |
| 4,091,274 | 5/1978 | Angelbeck et al. | 350/295 |
| 4,093,351 | 6/1978 | Perkins et al. | 350/295 |

Primary Examiner—F. L. Evans
Attorney, Agent, or Firm—Cole, Jensen & Puntigam

[57] ABSTRACT

A focusing reflective mirror which is fabricated of a hoop structure having a reflective metalized membrane stretched over one face thereof and a metalized backing membrane over the opposite side forming a closed reflective structure. The contour of the flexible reflective surface is controlled by a differential pressure between the enclosed area behind the reflective surface and the ambient pressure. The particular configuration or contour of the reflective surface is controlled by a electropneumatic control system wherein a capacitive member is mounted behind the reflective surface and within the reflective structure which senses the distance between the capacitive member and the reflective surface and adjusts the focus by varying the relative pressure within the enclosed area behind the reflective member.

7 Claims, 5 Drawing Figures

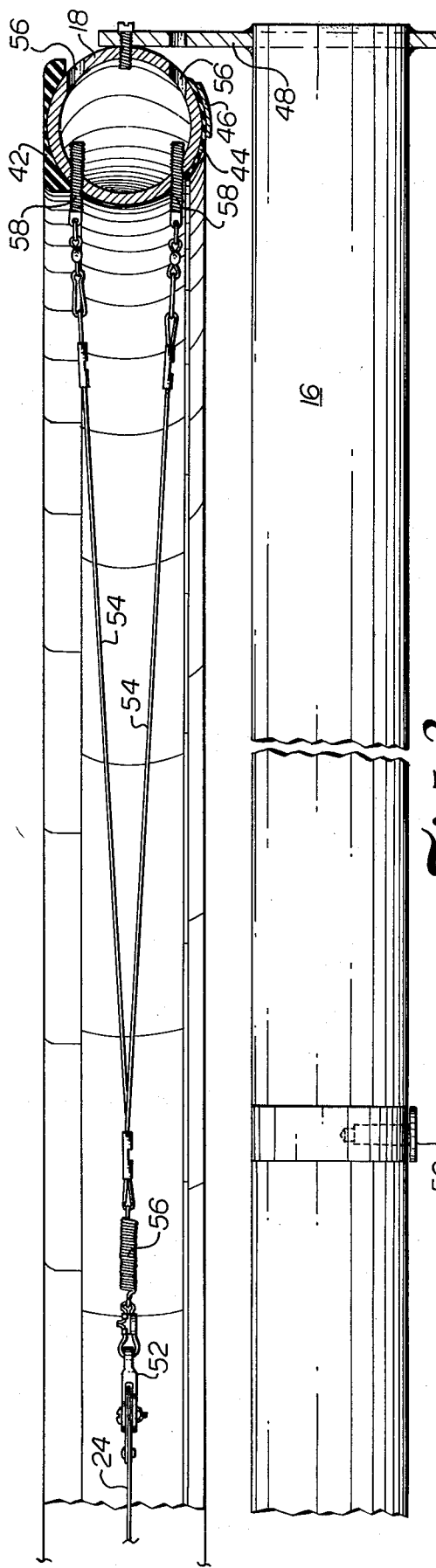
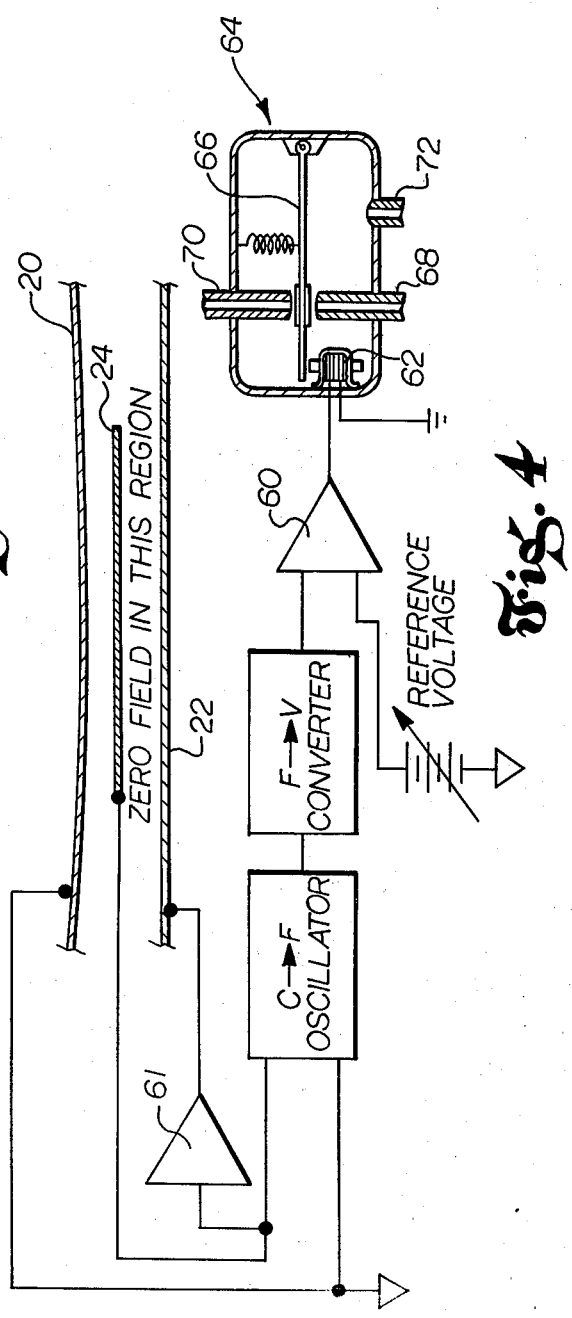

FOCUSING REFLECTOR

BACKGROUND OF THE INVENTION

It is well known to utilize mirrors and lenses to reflect and focus light rays and in particular it has become important to utilize concepts in the efficient capitalization upon solar energy in the face of our depleting natural resources.

One of the concepts which is currently undergoing experimentation is the utilization of a large number of mirrors to reflect sunlight or solar energy to a central generator or boiler which will utilize substantially all of the reflected light and convert it to more common energy forms. It becomes apparent that there are locations where there is not enough unobstructed surrounding area to accommodate a sufficient number of planar mirrors to concentrate the solar energy and therefore, it is necessary to utilize a concave reflecting and/or focusing system to develop the necessary heat. The expense of inflexible concave mirrors of a large scale is prohibitive, and therefore, a focusing membrane appears to be a practical approach. As will be noted hereinafter, there are previous examples in the patented art of mirrors which are constructed of metalized fabric that are formed into a configuration which serves to concentrate the reflected light.

One of the problems inherent with using a contour-controlled metalized membrane, although substantially less expensive than an equivalent glass mirror, is that it is subject to distortion and change with a change in the angle to the local gravitational field or by changes in relative atmospheric pressure. Various attempts have been made, as illustrated hereinafter, to assure that the configuration of the concentrating and reflecting surface comprising a metalized membrane be held uniform, each of these attempts as will be obvious, have inherent deficiencies. It is believed the present invention overcomes the deficiencies of the prior art.

In general, the present invention deals with a flexible metalized reflective membrane capable of being focused upon a target and which is able to maintain, even though orientation is varied, a controlled curvature. The mirror, in its entirety, comprises a pair of air impermeable membranes closing the front and back surface formed by a hoop type framework thus forming an enclosed area. A sensing member in the form of a capacitive plate is suspended between the membranes and by control apparatus, the relative pressure between the membranes with respect to the surrounding or ambient pressure is adjusted to maintain the membrane in a constant curvature. The curvature or location of the membrane is measured by electronically determining the distance between the capacitive plate and the metalized membrane. A guard electrode is utilized to reduce capacitance variation.

Prior art known to the inventor includes U.S. Pat. No. 3,001,196 granted Sept. 19, 1961 to McIlroy et al wherein the pressure within a chamber behind a direct beam antenna is varied to change the shape of the antenna and thus the shape of the beam.

U.S. Pat. No. 3,031,928 granted May 1, 1962 to Kopito teaches the concept of utilizing a capacitive probe to determine the location of the reflective surface and a control system to alter the relative pressure and thus change the location of the reflective surface.

U.S. Pat. No. 3,254,342 granted to Miller on May 31, 1966 teaches the concept of an antenna system wherein an intermediate reflector has its shape changed to vary the band width. The secondary reflector has its shape changed by utilization of a flexible reflector surface and the introduction of air or some other formative agent behind said reflector.

U.S. Pat. No. 3,273,157 granted to Kirstein on Sept. 13, 1966 utilizes a pneumatic control system for varying the shape of a radar antenna.

U.S. Pat. No. 3,289,205 granted Nov. 29, 1966 to Kampinsky teaches a method of fabricating a large surface reflector as well as means for determining the electromagnetic characteristics of the surface.

U.S. Pat. No. 3,325,887 granted to Bird et al on June 29, 1967 teaches a method of fabricating a parabolic air inflated fabric structure as well as the structure itself.

U.S. Pat. No. 3,493,290 granted to Traub on Feb. 3, 1970 teaches the concept of a reflective membrane serving as one plate of a capacitor used in determining the location of the reflective membrane.

U.S. Pat. No. 3,510,205 granted to Schiffman et al on May 5, 1970 teaches the concept of a mirror which is mechanically moved in response to a photocell circuit to dim the reflection.

U.S. Pat. No. 3,514,776 granted to Mulready on May 26, 1970 teaches the utilization of an adjustable, reflecting concave face for aiming a laser beam. The mirror is formed by a plate mounted in a housing and has its configuration adjusted by forces acting between the surface and the housing.

U.S. Pat. No. 3,623,793 granted to Merten et al on Nov. 30, 1971 teaches the concept of an adjustable magnifying mirror wherein a flexible reflector is mounted within an air tight seal and the mirror is changed in configuration by means of a differential pressure created between the rear portion of the mirror and the atmosphere.

U.S. Pat. No. 3,893,755 granted to Cobarg et al on July 8, 1975 teaches the concept of an adjustable focal length mirror wherein the focal length of the mirror is changed by moving a supporting frame sealingly mounted within a tubular member to change the relative pressure.

U.S. Pat. No. 3,936,159 granted to Pavenick on Feb. 3, 1976 teaches the concept of forming a heat shrunk plastic film mirror wherein the shrinking of the film urges the resilient upper section of the frame inwardly causing the film to be maintained in the stage of constant tension.

U.S. Pat. No. 3,972,600 granted to Cobarg teaches the concept of a mirror having an adjustable focal length wherein the relative pressures on either side of the mirror within a sealed compartment may be altered thereby changing the configuration of the mirror.

U.S. Pat. No. 3,623,796 granted to Schweiger on Nov. 30, 1971 teaches the concept of a mirror fabricated with a light reflective resilient membrane sealingly secured to a housing and a pump capable of creating a partial vacuum to change the shape and thus adjust the focal length of the mirror.

With the above noted prior art and inadequacies in mind, it is an object of the present invention to provide a simple, inexpensive means for providing a focused reflective surface and a reliable means for maintaining the proper focus upon that reflective surface even though varying forces are generated by a difference in attitude of the reflector or by a change in ambient conditions.

It is another object of the present invention to provide a unique control system for maintaining the proper focus of a flexible reflector comprising a capacitive member mounted within an enclosed area adjacent the reflective surface and measuring the distance between the capacitive member and the reflective membrane. Any change in relative position alters the capacitance and the control system thus determines the variation in pressure necessary within the enclosed area to maintain the proper focus of the reflective surface.

It is another object of the present invention to provide a large scale flexible reflective surface wherein the control for the focal configuration is substantially independent of the relative orientation of the reflective surface or of the differentials caused by changes in atmospheric conditions.

Still a further object of the present invention is to provide a capacitive control system for the focal length of a flexible reflective system wherein the capacitive member is electrically isolated from the reflective member and its supporting structure although suspended within the assembly.

A further object of the present invention is to provide a lightweight membrane covering the rear of the focusing mirror cavity, metalized to be electrically conductive, the membrane being electronically driven to the same potential as the capacitive member and shielding the latter from all variations in external electric field gradients, thus removing any environmental disturbance to the measurement of capacitance of the reflecting membrane.

BRIEF DESCRIPTION OF THE DRAWINGS

FIG. 3 is a section taken along the lines 3—3 of FIG. 2 more specifically illustrating the relative positioning of the various elements in the focusable mirror.

FIG. 4 is a partial schematic showing the controls necessary for the present invention.

DETAILED DESCRIPTION OF THE DRAWINGS

Figure 1:
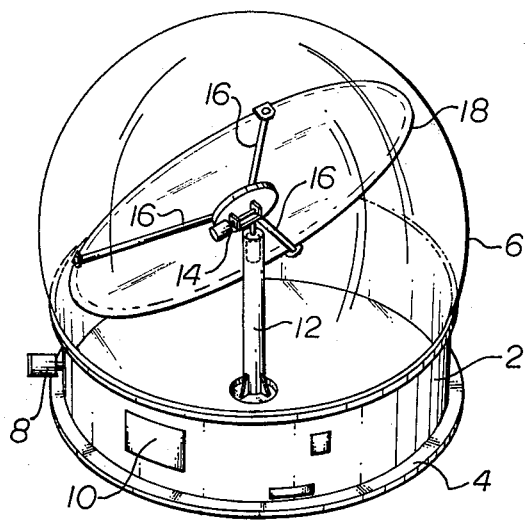
FIG. 1 is an environmental view showing a reflective member utilizing the present inventive concept mounted within a protective bubble the assembly primarily designed for the capture of solar energy.

As seen in FIG. 1, the reflective assembly and its protective structure includes for example a steel wall 2, secured to a suitable foundation 4 supporting a transparent air-supported dome 6. The steel wall element has secured thereto a blower filter assembly 8, has an access door 10 and means to secure the dome 6. It is to be understood that although this particular portion of the disclosure is not considered to be a part of the invention, the blower filter assembly as well as any of the control mechanisms or conduits can easily be located completely beneath ground resulting in a clean exterior.

Mounted within the enclosure is a pedestal 12 having a gimbaled mounting 14 which, in the preferred embodiment, supports the reflective assembly framework which includes three radial arms 16 and circular outer rim 18.

Figure 2:
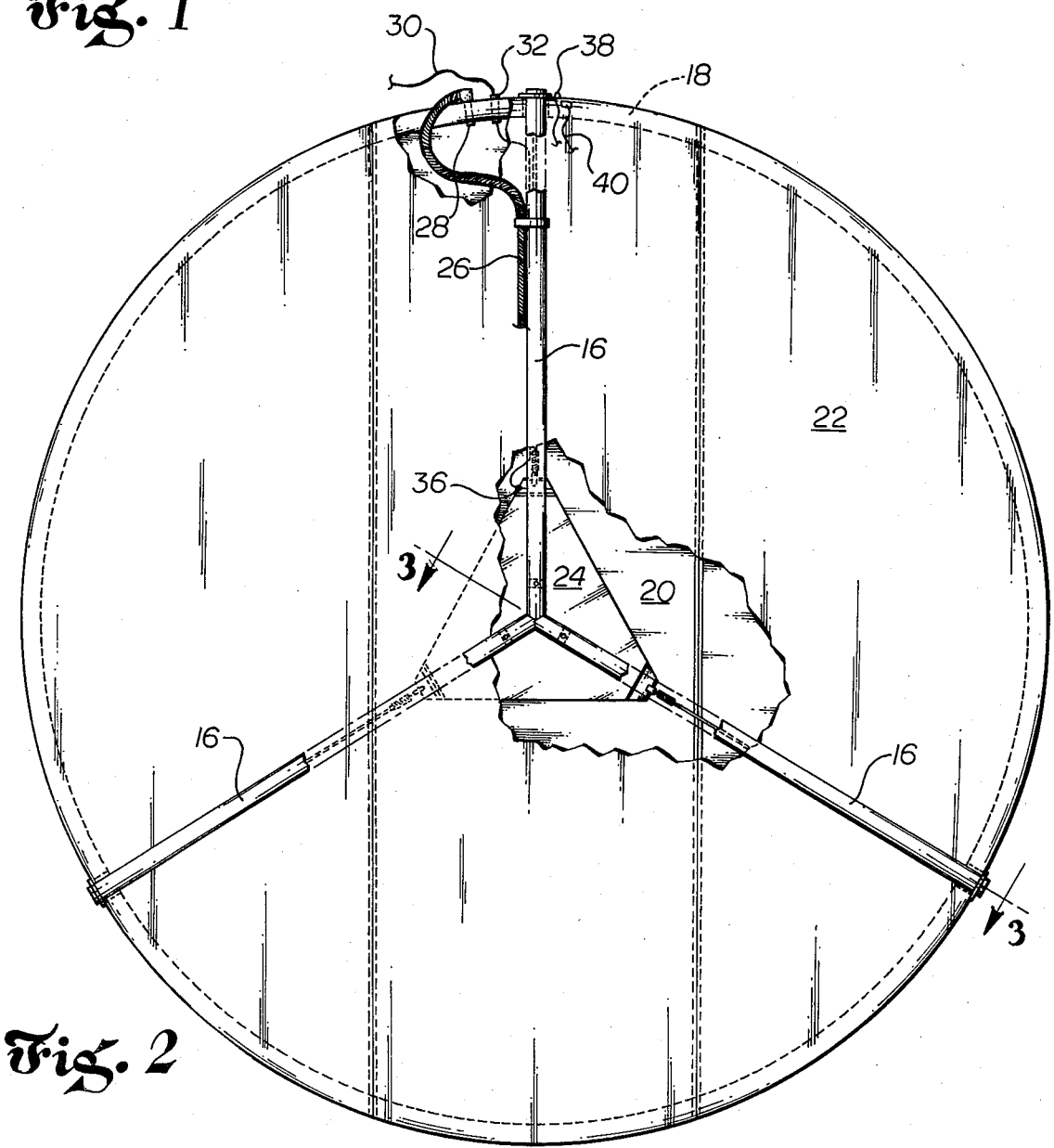
FIG. 2 is a plan view of a focusable reflective assembly in accordance with the present invention showing the required support members and the capacitive member which is necessary for the control of the focus.

Referring now to FIG. 2, which is a plan view of the reflector assembly as seen from the bottom portion thereof it can be seen that the outer rim 18 is generally of a hoop configuration and has secured thereto three radially extending arms 16 which are, as best seen in FIG. 3, exterior to and generally below the reflector assembly. The reflector assembly is an enclosure formed by the hoop 18, a reflective surface 20, which would be of a tension aluminized mylar or similar substance, and a rear membrane 22. In the preferred embodiment, the rear membrane is of a similar substance to the front membrane such that the two membranes react substantially uniformly against the framework if there be any dimensional change in the framework.

Figure 5:
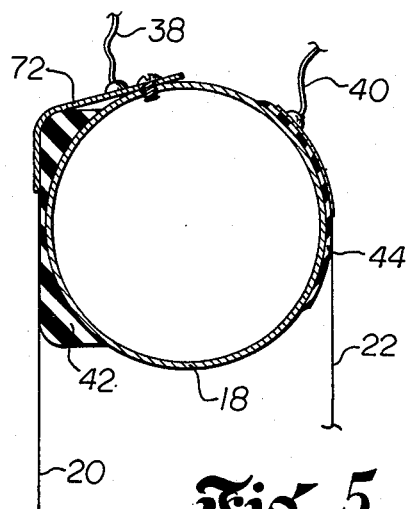
FIG. 5 is a section taken through the hoop frame work of the focusable reflector particularly illustrating the electrical contact members.

Mounted between the two metallized members 20 and 22 and secured in place by tensioning members, as described in greater detail hereinafter, is the capacitive surface 24 in a triangular configuration. Also seen in this view is a conduit or vacuum tube 26 which is secured to one of the arms or spokes 16 and is in communication with the interior of the reflective assembly by means of a tube 28 passing through the rim 18. Conduit 26, as explained hereinafter, permits a change in pressure within the assembly responsive to a detected change in the focus by the control described in detail hereinafter. A lead wire 30 is electrically isolated from the rim 18, passes through an insulator 32 secured in a bore through the rim and then is secured to, but isolated from, one of the tension members which supports the capacitor 24. The lead is secured to the capacitive member 24 at 36. Also seen in this view, and explained in greater detail in FIG. 5, are a pair of leads 38 and 40 which complete the necessary circuit for the electropneumatic control.

Attention is now directed to FIG. 3 wherein the rim 18 can be seen and, in the preferred embodiment, includes a polymer foam element or bonding material 42 secured to the outer surface thereof such that it forms a substantially planar front surface the reflective surface (not shown) can be secured to the rim 18 and yet the rim can be fabricated without undue restrictions upon manufacturing tolerance. The back side of the rim 18 likewise has a foam surface or bonding material 44 for purposes similar to that performed by 42, i.e. presenting a substantially planar surface and includes a metalized clip 46 for purposes hereinafter described. It is to be understood that if sufficient accuracy is maintained in the manufacture of the frame and it presents a substantially planar front and back surface, the foam element may be removed from the front reflective surface, however, for proper control, as explained hereinafter, the rear metalized surface must be electrically isolated from the frame. As seen in this view, the supporting rim 16 is mounted to the rim 18 by means of a standoff bracket 48 and further includes means 50 to enable the mounting of the arm 16 to the gimbaled element which as explained hereinabove, permits varying orientation.

The capacitive element 24 can be seen at the extreme left hand portion of the figure and is secured in a stable position relative to the reflective film by means of a cable tensioning system. The cable tensioning system comprises three tensioning elements extending to the hoop 18, each of which are secured to the corner of the capacitive element 24 by means of a clevis 52. The tensioning or securement element is a thin nonconductive line 54, preferably with a small amount of give or elasticity. As seen in this view, at least one of the tensioning support members will include a spring 56 to assure a constant tension and permit dimensional changes within the structure without damage to the capacitive element. As seen in this view, the lines 54 are secured to threaded element 58 engaged with the interior surface of hoop 18. The exterior surface of the rim or hoop 18 includes a pair of bores 56 located radially outwardly of the end of each tensioning element to permit the insertion of a tool to cooperate with threaded members 58 enabling adjustment of the tension upon the line 54.

Thus as shown, the particular suspension of the capacitive element 24 between the two reflective surfaces 20, 22 assures that the capacitive element will remain in a constant relative position with respect to the reflective surface and thus can readily detect any variation in the configuration of the reflective surface which would result in a change in the focal length.

Referring now to FIG. 4, a simplified schematic view of one possible implementation of control circuit is shown. As seen in this view, the capacitive element 24, is an integral part of the control circuit. The capacitor sensor plate 24 is located adjacent the center of the grounded reflector membrane 20 and between the membrane 20 and the guard electrode 22. Variations in spacing between the sensor plate 24 and the membrane 20 change the capacitance and hence the voltage applied to the differential amplifier 60. The change in capacitance is sensed and passed through a capacitance to frequency oscillator and then through a frequency- to voltage converter prior to entering the amplifier 60. A reference voltage is supplied and could well be controlled by a digital/analog converter from a computer command. The output of the differential amplifier in turn drives a linear actuator which balances airflow in the pneumatic control device 64. It is to be noted that the rear membrane 22 is used as a guard electrode. The rear membrane is driven to reduce the variations of capacitance of the sensor electrode 24 to the rear membrane or to external interference. This establishes substantially a zero field between the rear membrane 22 and the sensor 24. The pneumatic pressure control device takes advantage of the positive pressure in the protective transparent dome described hereinabove to produce a controlled, reduced pressure within the reflective element for focusing. In operation, the pneumatic control device 64 utilizes a spring loaded impingement arm 66 to balance the flow between the enclosure vent 68 and the ambient pressure vent tube 70 such that a slightly reduced pressure is applied to the mirror for focusing via the conduit 26. The focus control is achieved in this system by means of adjusting the reference voltage to the differential amplifier.

Attention is now directed to FIG. 5 wherein the details of the grounding attachment for the reflective membrane can be seen. As seen in this view, the reflective membrane 20 passes over the outer surface of the foam member 42 and is secured in place, in part, by means of a clip member 72 to which a lead 74 is secured. The rear reflective member 22 likewise passes over the foam element 44 and is secured by means of a clip member to a lead 40 thus assuring a grounded system.

Thus as can be seen by isolating the capacitive sensing member from the reflective surface and shielding it from external interference the particular location of the reflective surface may be easily determined and controlled by means of a slight variation in the relative pressure within the reflective assembly. The structure is simply and easily constructed and yet because of the unique means of control and structural integrity is extremely reliable and accurate.

What is claimed is:

1. A focusing mirror comprising:
   a rigid exterior closed frame member defining a substantially planar surface on both the front and the back,
   gas impermeable members covering the front and the back of the frame member, spanning the distance defined by the frame and secured thereto, at least one of which gas impermeable members is flexible and has a reflective coating upon its exterior surface,
   capacitive sensor means electrically isolated from the reflective membrane, mounted by a suspension system within the frame and between the gas impermeable members,
   means for controlling the pressure between the gas impermeable members relative to the ambient pressure said means responsive to a variance in capacitance between the capacitive sensor means and the coated membrane caused by a varying distance between the capacitive sensor means and the reflective membrane and by varying the relative pressure adjusting the curvature of the reflective membrane and controlling the focus whereby a predetermined focus is maintained even though the orientation of the mirror is altered or the ambient pressure changes.

2. A focusing mirror as in claim 1 wherein the frame member is in the form of a hoop and the capacitive member is triangular and suspended by each corner.

3. A mirror as in claim 1, wherein the suspension system includes at least one resilient member to absorb any radial dimensional variations.

4. A mirror as in claim 2, wherein the reflective surface is grounded and the lead from the capacitive sensor is secured to but isolated from one of the elements suspending the capacitive sensor, passes through the frame but is electrically isolated therefrom and then to the control means.

5. A mirror as in claim 1, wherein the focusing mirror is supported by a gimbaled structure and is used to reflect and concentrate solar energy.

6. A mirror as in claim 1, wherein the suspension system is secured by means enabling adjustment of the precise location of the capacitive sensor means following assembly.

7. A mirror as in claim 1, wherein the gas impermeable members are conductive, the front membrane is reflective and controlled and the rear membrane is electrically driven thereby shielding the capacitive sensor means from external interference.

* * * * *